United States Patent [19] [11] 4,149,494
Wolfinger et al. [45] Apr. 17, 1979

[54] AIR QUANTITY METERING APPARATUS

[75] Inventors: Helmut Wolfinger, Sonthofen; Hermann Hoelle, Blaichach; Peter Romann, Stuttgart, all of Fed. Rep. of Germany

[73] Assignee: Robert Bosch GmbH, Stuttgart, Fed. Rep. of Germany

[21] Appl. No.: 728,147

[22] Filed: Sep. 30, 1976

[30] Foreign Application Priority Data

Oct. 7, 1975 [DE] Fed. Rep. of Germany ....... 2544791

[51] Int. Cl.² .......................... F02B 3/00; G01F 1/28
[52] U.S. Cl. ................................ 123/32 EJ; 73/228; 73/194 E
[58] Field of Search ................ 123/32 EJ, 32 EA; 73/194 E, 228

[56] References Cited

U.S. PATENT DOCUMENTS 2,501,060  3/1950  Leibing ............................... 73/228
3,616,780  11/1971  Helle ............................. 123/32 EA

FOREIGN PATENT DOCUMENTS 2205509  2/1972  Fed. Rep. of Germany ..... 123/32 EA
2246373  9/1972  Fed. Rep. of Germany ....... 123/32 EJ Primary Examiner—Charles J. Myhre
Assistant Examiner—P. S. Lall
Attorney, Agent, or Firm—Edwin E. Greigg

[57] ABSTRACT

Disclosed herein is an air quantity metering apparatus for use in internal combustion engines including a fuel injection system having an air intake manifold provided with a barrier flap which is mounted on a shaft to which is attached, exteriorly of said manifold, a spring loaded mechanism that serves to pretension the barrier flap in dependence upon conditions that exist in said manifold.

5 Claims, 5 Drawing Figures

AIR QUANTITY METERING APPARATUS

BACKGROUND OF THE INVENTION

The invention appertains to an air quantity metering apparatus and more particularly, to a fuel injection system of a combustion engine having a barrier flap which is pivotably mounted in a flow path on a shaft extending transversely of the flow path. A first restoring spiral spring element is wound around a free end of the shaft and has one end attached to a cam affixed to the shaft while the other end of the spring element is secured to the inner wall of a rotatable housing member, the outer periphery of which is formed with a plurality of teeth. An additional spring member is arranged to cooperate with the teeth on the rotatable housing member and functions together with the first restoring spring element to provide for pre-tensioning of the barrier flap and flow control in said flow path.

In commonly known air-quantity metering devices of this type, the securing of the spring housing, which is made of a synthetic material, is accomplished by squeezing it against the air metering housing with the aid of a screw. That method entails the danger that in actual usage in a motor vehicle during attendant changes in temperature and in the presence of vibrations the friction between the spring housing and the air-metering housing prove inadequate, thus letting the spring housing deviate from its intended pre-tensioned setting. Furthermore, in order to set the pre-tensioning of the spiral spring, the aforesaid screw must in each instance be first loosened, thereby removing the friction securing the spring housing, and then the screw must thereafter be retightened. As a result, the danger always exists that the threads of the screw connection will be damaged by continued use.

OBJECTS AND SUMMARY OF THE INVENTION

Therefore, it is the primary object of the present invention to develop an air quantity metering apparatus of the commonly known type, which, however, prevents any undesired changes in the pre-tensioning of the spiral spring during operation, and which offers a simple means for the adjustment of the pre-tensioning of the spring.

According to the invention, this objective is achieved through the use of a retention spring which serves to arrest the rotation of the spring housing, one extremity of said spring being attached to the air metering housing, while the other movable extremity of which is twisted in such a manner as to snap into the toothed rim gear of the spring housing parallel to the surfaces of the teeth.

An advantageous refinement of the invention consists in the fact that the retention spring is made of wire having a circular cross section, and the movable extremity of the retention spring extends over the spring housing as it secures the spring housing in its axial position.

A further advantageous refinement of the invention derives from the fact that the retention spring forms a loop, through which a screw enters, thus attaching it to a recess in a shoulder in the air metering housing, and that an integral anchor spring extends out symmetrically from the loop, serving to secure the spring housing in its axial position, The refinements of the present invention offer the additional advantage that the given unique setting of the spring housing is preserved even during variations of temperature, due to the engagement of the retention spring with the toothed rim gear of the spring housing. To this accrues the simple setting or re-setting of the basic pre-tension of the spiral spring, by means of a simple tooth by tooth turning of the spring housing, without the need of first loosening a screw, or of tightening that screw subsequent to the setting procedure.

The invention will be better understood as well as other objects and advantages thereof become more apparent from the following detailed description of the invention taken in conjunction with the drawing.

DESCRIPTION OF THE PREFERRED EMBODIMENT

Figure 1:
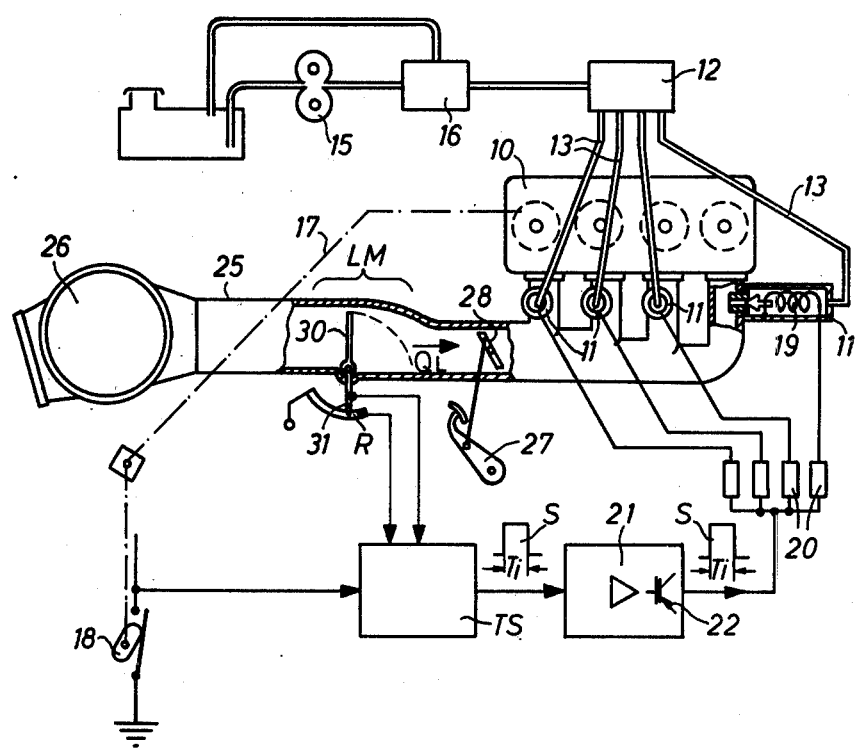
FIG. 1 shows an electrically controlled fuel injection system with its air quantity metering device in a plan view and includes a partially schematic representation.

With reference to FIG. 1, the illustrated fuel injection arrangement of the invention is intended for a four cylinder, four stroke, internal combustion engine 10. The arrangement essentially comprises four electromagnetic fuel injection spray valves 11 that are connected by respective fuel conveying pipes 13 to a distributor 12, and an electric motor driven fuel pump 15, a pressure regulator 16 that keeps the fuel at a constant pressure, and an electronic control (U.S. Pat. No. 3,750,631) that a triggering means or signal generator 18, which is coupled to the engine cam shaft rotating synchronously with the crank shaft, operates twice during each complete rotation of the crank shaft to produce one rectangular valve opening pulse S. These pulses cause the valves 11 to open. The period $T_1$ of the pulse S determines the open time of the valve 11 and therefore the amount of fuel that is forced out of a valve at a nearly constant pressure of 2 atmospheres. The magnet coils 19 of the fuel injection spray valves 11 are connected in series with respective decoupling resistors 20, which latter are connected in common to the output of an amplification and power output stage 21. The stage 21 contains at least one power transistor 22, the emitter collector path of this transistor being connected in series with the decoupling resistors 20 and the magnet coils 19, which latter are connected at one end to ground.

With external auto ignition gasoline engines of the kind illustrated the amount of air sucked into a cylinder during a single suction stroke determines the amount of fuel that can be completely burned during the following power stroke. If the engine is to be used efficiently, little air should remain after the power stroke. In order to obtain the desired stoichiometric ratio between air and fuel, there is provided in the intake manifold, between the filter 26 and the throttle valve 28, an air meter LM, which essentially comprises a static plate 30 and an adjustable resistor R of which the movable tap 31 is coupled to the static plate, these components together constituting adjusting means. The position of the throttle valve 28 is controlled by an accelerator 27. The air meter LM operates in conjunction with a transistor switch TS, the output of which delivers the control pulse S for the output stage 21.

When the revolutions per unit time are lower than 2000 rpm, and during periods of heavy loading, the aspirated air flow manifests a strong pulsation; this can lead to a condition wherein the barrier flap oscillates strongly about a median attitude which does not correspond to the actual average instantaneous value of the air quantity QL. In order to avoid this kind of mismatching, the hereinafter described example of the embodiment of an air quantity metering device incorporates a pneumatic damping mechanism, which, on the one hand, prevents any oscillation of the barrier flap 30 beyond the attitude corresponding to the average instantaneous value of the aspirated air quantity, and which, on the other hand, permits the necessary rapid response of the barrier flap 30 to changes in the aspirated air quantity.

In the remaining figures, i.e., FIG. 2 to FIG. 5, the air quantity metering device comprises a die cast zinc housing 41, with a central base plate 42, and integral side walls 43 and 44, which form a metering channel 46 and a damping chamber 62, in conjunction with an inserted die cast zinc cover plate 45. The metering channel 46 contains the barrier flap 30, the integral damping wing 47 which is radially offset some 100° in the downstream direction on their common hub 48. In order to obtain a preferably frictionless and play-free pivoting of the barrier flap 30 and its damping wing 47 as well as to assure the accuracy of the air quantity measurement and to maintain a steady damping effect at the air space 49 formed between the free edge of the damping wing 47 and the cylindrical sector constituting the chamber wall 50, the hub is supported on a shaft 51, which carries two axially spaced ball bearing races 52 and 53. The hub 48 is provided with integral ribs 54 and 55, respectively, which serve to stiffen the barrier flap 30 and the damping wing 47, which includes a cavity for approximately two-thirds of its axial length and into which protrudes a collar 56 that is integral with the base plate 42 and is arranged to receive the two outer surfaces of the bearing races 52 and 53. In order to maintain an air space of approximately 0.2 to 0.3 mm between the sides of the damping wing 47 and the base plate 42, the cover 45 or the shaft 51 is axially secured by means of a snap ring 57, which fits into a groove (not here detailed) and by a spring plate 58 inserted between the snap ring and the inner race of the ball bearing race 53.

In the depicted example of this invention, the metering channel 46 with its rectangular cross section may be associated with a part of the intake manifold thereby connecting the filter 26 to the individual intake passages of the cylinders, and is therefore equipped with an integral, cast flange 60, serving to mate with the segment 25 of the air intake. A rearwardly extending mating flange 61 similarly permits the downstream connection of the metering channel 46 with that section of the air intake pipe which contains the throttle valve 28. Over the pivoting range of the barrier flap 30, the wall 44 of the metering channel 46 is shaped in such a manner as to produce an exponential enlargement of the cross sectional opening which admits the aspirated air with respect to an increase (corresponding in FIG. 4 to a counterclockwise movement) of the pivoting angle of the barrier flap 30. This construction has the advantage that the relative indication error $\Delta QL/QL$ remain constant within the pivoting range where QL is the aspirated air flow rate.

The pivoting motion of the barrier flap 30, as well as that of the integral damping wing 47 takes place against the virtually constant force of a spiral spring 65, which is secured within a central cavity of the spring housing 67 by a rivet 68. The other extremity 69 of the spiral spring 65 is attached to a cam 70 in such a way that the spiral spring emanates from the cam practically at a right angle, thus forming a continually large lever arm with respect to the turning axis of the shaft 51, the free end 71 of which is provided with opposing flat surfaces 72 and 73 that protrude beyond the base plate 42 and mate with the cam 70. The spring housing 67 carries an integral toothed rim gear 75, with which the stem of a pinion gear, (not shown) may be made to engage by being positioned in the boring 76, thus providing for a sensitive adjustment of the spring pre-tension to a given predetermined value, and by means of which a counterclockwise turning of the spring housing corresponds to an increase in the spring tension, as is believed clear from the view in FIG. 5. A retention spring 120, one end of which is attached to the air metering housing by a restraining screw 121, serves to secure the given setting of the spring housing 67, and thus the pre-tension of the spiral spring 65, by having its other movable extremity 122 twisted in such a way as to engage the toothed rim gear 75 of the spring housing 67, parallel to the faces of the teeth. The retention spring 120 is preferably made of round steel wire, and incorporates a restraining loop 123 which is held by the screw 121 in a recess 124 formed by spaced shoulders 125 provided on the air metering housing. To secure the position of the spring housing 67 relative to the air metering housing, the movable extremity of the retention spring 120 extends over the spring housing 67, and also features an integral anchor spring 126 which includes a leg that extends out symmetrically relative to the restraining point 121, 123, and which also extends over the spring housing 67. When the spring housing 67 needs to be turned in order to adjust the pre-tension of the spiral spring 65, the toothed rim gear 75 is shifted, tooth by tooth with the aid of the above-described pinion gear, whereby the movable extremity of the retention spring 120 in each case snaps into the corresponding tooth gap, all without having to loosen the restraining screw 123.

The accuracy of the air quantity metering device is influenced, aside from the quality of the bearing and the low hysteresis here achieved, primarily by the stability, durability and indifference to changes in temperature of the spiral spring 65 which is made of a special nickel-beryllium alloy.

A slider-carrier 78, also made of synthetic material, is received on the free end section of the shaft 51 adjacent to the cam 70 of the spiral spring 65. The slider-carrier includes an integrally molded bed 79, also made of synthetic material, provided with an equalizing weight 80 and by means of which the metering system is statically balanced. Upon the slider-carrier 78 which forms the wiper 31 of the potentiometer according to FIG. 1, there is provided a slider spring 81, which is die-punched to provide an arcuate portion having a reentrant bend, the contacts 82 and 83 of which lie on an arc-shaped resistance track 84 of the potentiometer wafer 85.

Figure 2:
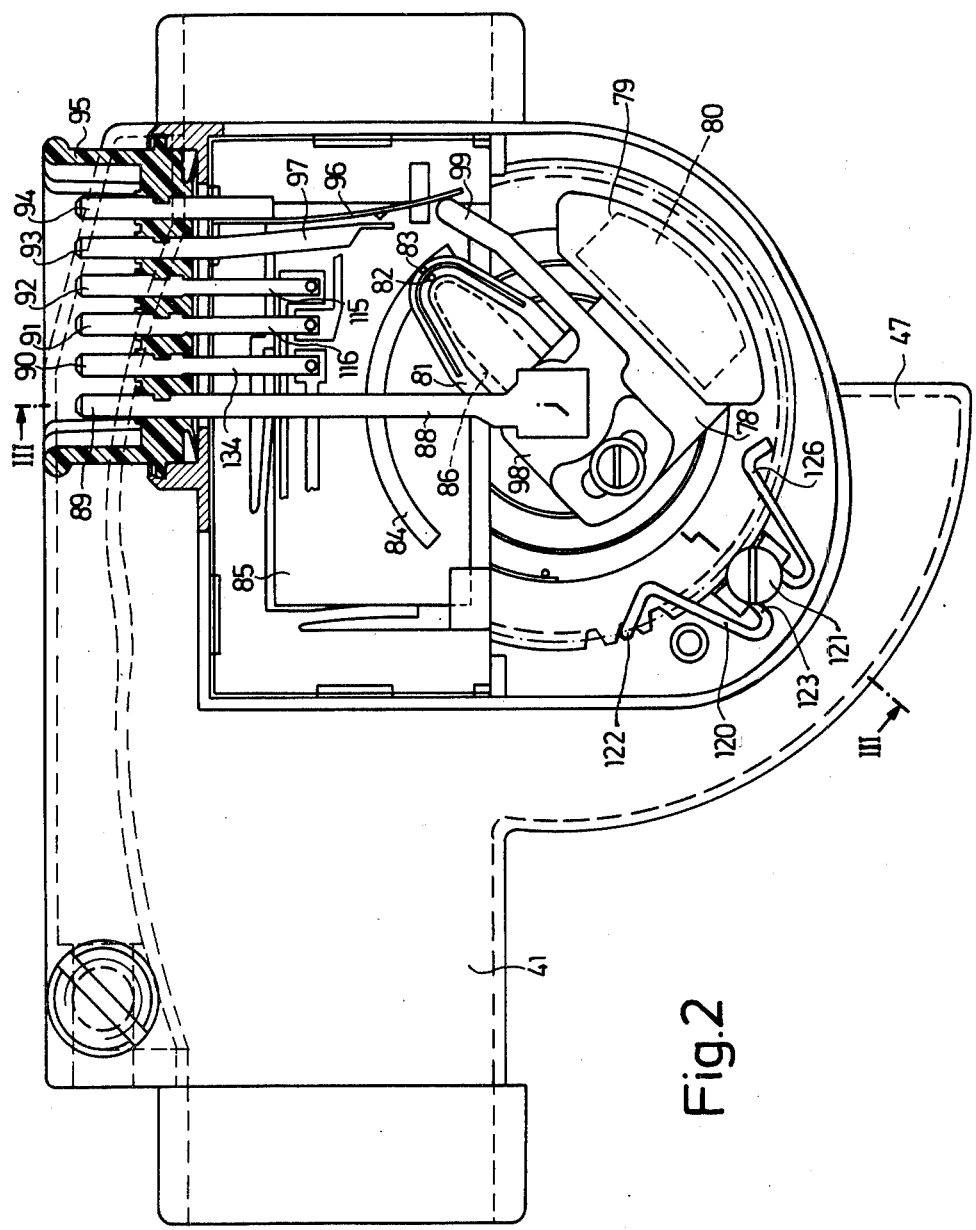
FIG. 2 shows the air quantity metering device including its pneumatic damping mechanism, in a side view, and partly in a section II—II of FIG. 3.
Figure 3:
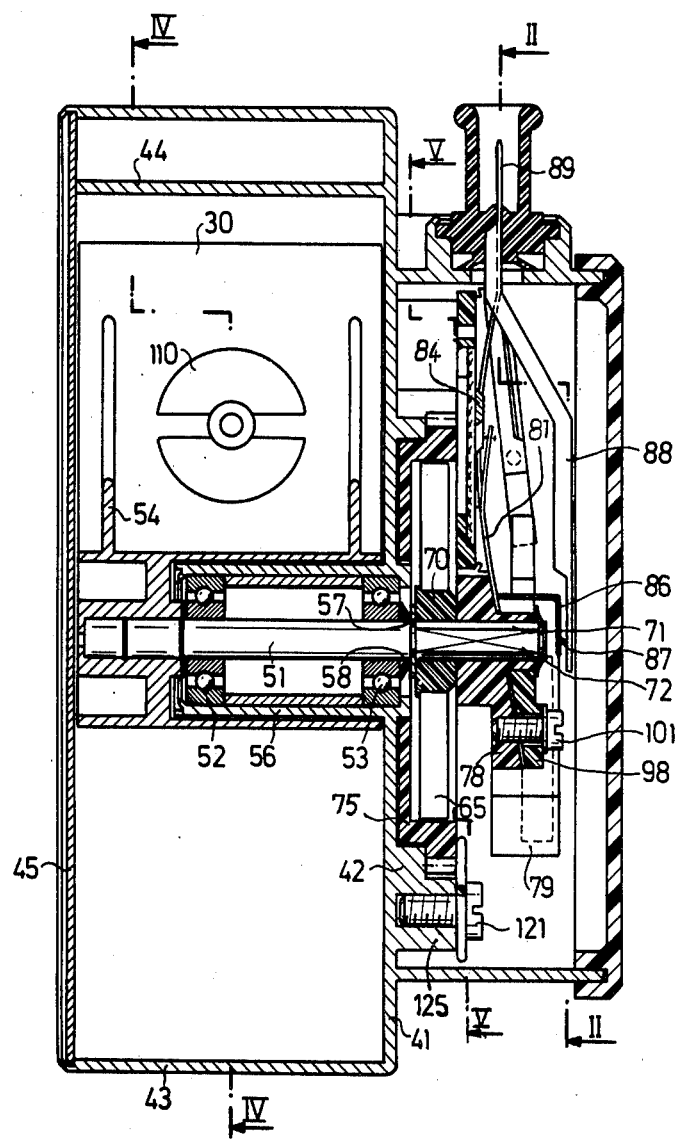
FIG. 3 is a sectional view along the line III—III of FIG. 2.
Figure 4:
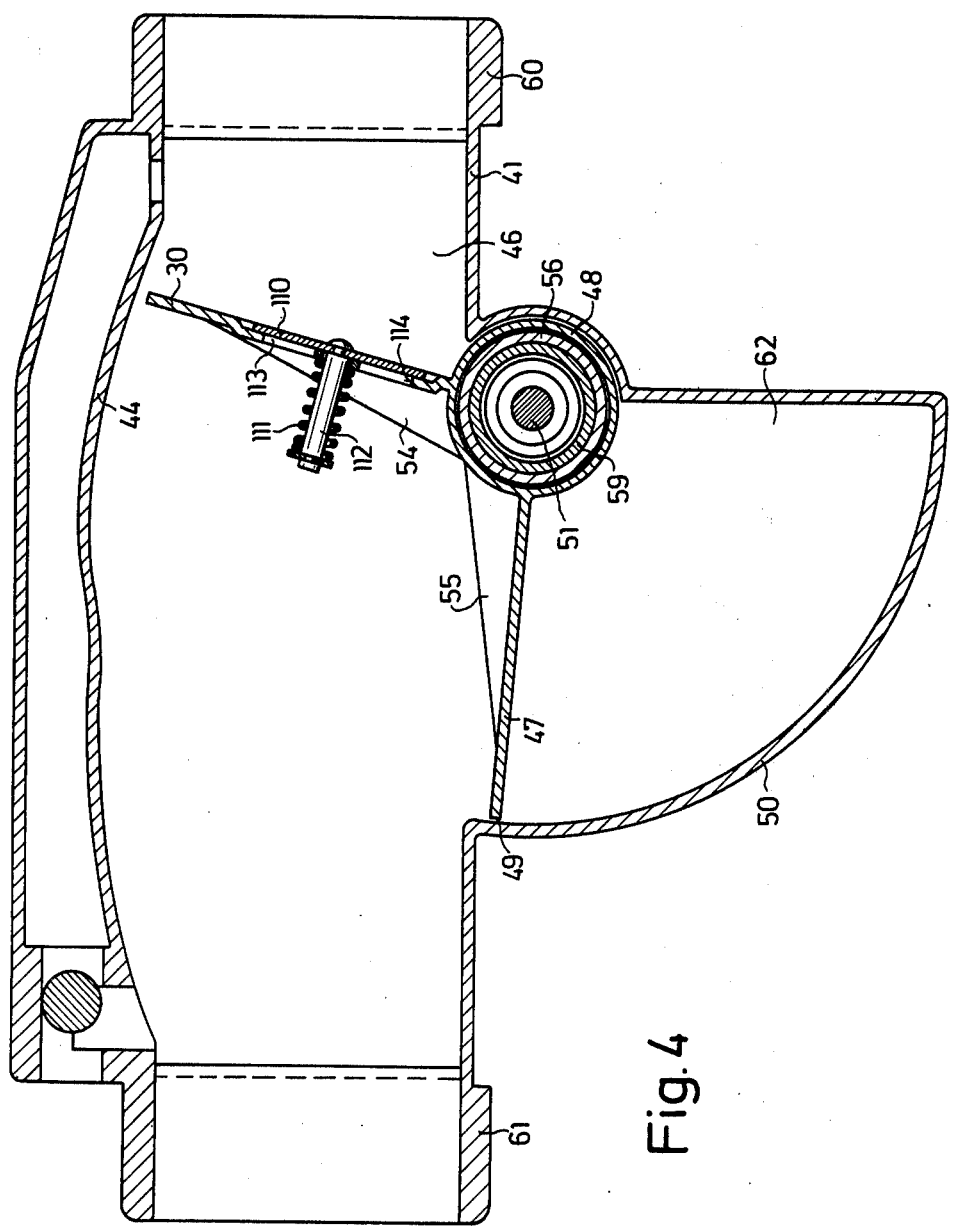
FIG. 4 is a sectional view along the line IV—IV of FIG. 3.
Figure 5:
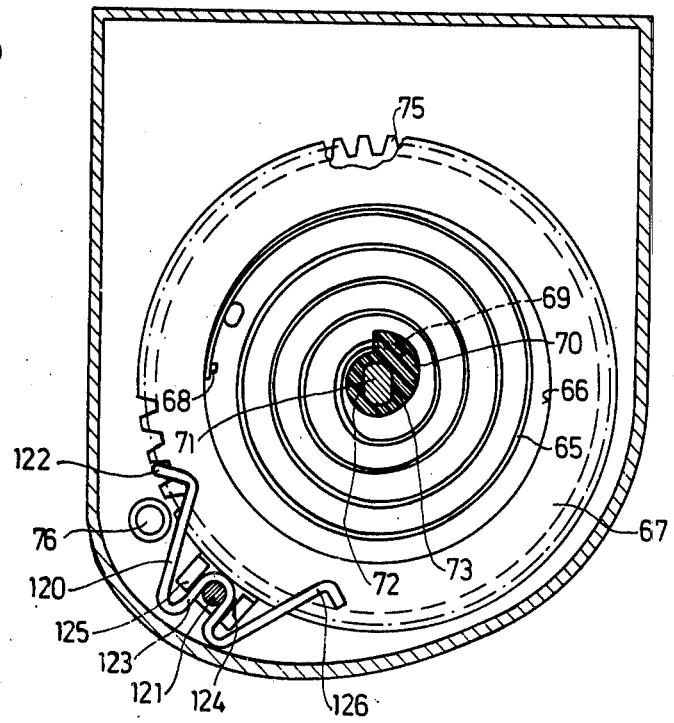
FIG. 5 is a sectional view along the line V—V of FIG. 3.

In FIG. 2, the dashed line 86 denotes the periphery of a tongue, which is incised during the die punching of the slider spring 81 and which assumes its more easily recognizable shape in FIG. 3 by being bent twice in two approximately right angle directions. At the free end of this tongue there is provided a pressure contact 87 that is positioned at the imaginary elongation of the turning axis of the shaft 51, and which serves to make, virtually without frictional drag, the electrical connection between the slider spring 81 and a contact arm 88, which terminates in a tongue portion 89. This connector tongue is vulcanized, together with five additional tongue portions 90-94, into a socket member 95 which is made of synthetic material and into which a connecting plug may be inserted to create the electrical connection to the transistor switching circuitry TS. The rightmost tongue portion 94, as shown in FIG. 2, is associated with a spring means 96 which cooperates with an opposing contact 97, joined to the tongue portion 93 and which is lifted from the opposing contact 97 when the barrier flap 30 comes to a rest position, e.g., whenever the combustion engine is not running, all of which is brought about by by movement of the integral arm 99 of the pressure plate 98 which is mounted adjacent to the slider-carrier 78. The slider spring 81 can be adjusted angularly to a limited degree, relative to the barrier flap 30, independent of the pressure plate 98, and is thereafter secured by the screw 101 into the threaded hole in the slider-carrier 78.

To insure that the measuring system of the air quantity metering device will not be damaged when back-firing occurs in the intake manifold of the combustion engine, the barrier flap 30 contains a relief valve, comprising a valve plate 110, a pressure spring 111, and a guide rod 112. The spring holds the valve plate 110 against the rim of the two openings 113 and 114 in the barrier flap 30, thus covering them. Only when the pressure against the back of the barrier flap reaches the magnitude present during backfiring, does the valve plate 110 lift away from the openings 113 and 114, thus permitting the equalization of the pressures.

What is claimed is:

1. An air quantity metering apparatus for use with the fuel injection system of an internal combustion engine, comprising:
   a housing defining a passage which forms part of an air intake manifold of the fuel injection system;
   a shaft mounted to the housing and extending transversely to the air flow within the passage;
   a barrier flap pivotably mounted by bearings within the passage on the transversely extending shaft against a restoring force;
   a cam fitted to said shaft;
   a spring housing having a toothed rim gear at its periphery;
   a further bearing on which the spring housing is mounted coaxially to the shaft for turning relative to said shaft;
   a spiral spring attached at one end to said cam and at the other end to said spring housing, said spiral spring providing said restoring force, and the position of said spring housing being secured subsequent to the pretension setting of said spiral spring; and
   a retention spring one end of which is attached to the apparatus housing and the movable end of which is twisted in such a manner as to snap into the toothed rim gear of the spring housing parallel to the faces of the gear teeth.

2. The air quantity metering apparatus as defined in claim 1, wherein the retention spring consists of a wire having a circular cross-section.

3. The air quantity metering apparatus as defined in claim 2, wherein the movable end of the retention spring reaches over the spring housing to secure the axial setting of the spring housing.

4. The air quantity metering apparatus as defined in claim 3, wherein the apparatus housing includes spaced shoulders which defines a recess, and wherein the attached end of the retention spring includes a restraining loop which is held within the recess by a restraining screw.

5. The air quantity metering apparatus as defined in claim 4, wherein the retention spring includes an integral anchor spring which extends out symmetrically from the restraining loop, said anchor spring serving to secure the axial setting of the spring housing.

* * * * *